United States Patent [19]

Tanaka

[11] Patent Number: 4,819,069
[45] Date of Patent: Apr. 4, 1989

[54] TELEVISION SIGNAL SELECTION DEVICE
[75] Inventor: Yasushi Tanaka, Nagaokakyo, Japan
[73] Assignee: Mitsubishi Denki Kabushiki Kaisha, Tokyo, Japan
[21] Appl. No.: 79,324
[22] Filed: Jul. 30, 1987
[30] Foreign Application Priority Data
Aug. 20, 1986 [JP] Japan ............... 61-195997
[51] Int. Cl.⁴ .............................. H04N 5/50
[52] U.S. Cl. .................. 358/191.1; 358/195.1; 655/182; 655/192
[58] Field of Search ............... 358/191.1, 193.1, 195.1, 358/188; 455/154, 160, 164, 173, 182, 186, 192, 183; 334/13, 16

[56] References Cited

U.S. PATENT DOCUMENTS

| | | |
|---|---|---|
| 4,038,689 | 7/1977 | Rzeszewski et al. ............ 358/191.1 |
| 4,249,259 | 2/1981 | Oda et al. ........................ 455/182 |
| 4,262,364 | 4/1981 | Fujita ............................... 455/192 |
| 4,302,778 | 11/1981 | Tanaka ........................... 358/195.1 |
| 4,429,415 | 1/1984 | Chin et al. ....................... 455/192 |
| 4,439,787 | 3/1984 | Mogi et al. ..................... 358/195.1 |
| 4,498,191 | 2/1985 | Rogers ............................ 455/164 |
| 4,594,611 | 6/1986 | Sugibayashi et al. ........... 358/191.1 |
| 4,689,685 | 8/1987 | Testin et al. .................... 455/192 |

Primary Examiner—James J. Groody
Assistant Examiner—John K. Peng
Attorney, Agent, or Firm—Armstrong, Nikaido, Marmelstein & Kubovcik

[57] ABSTRACT

A television signal selection device comprising the fact that a band to-be-searched within a channel is checked successively from the upper side toward the lower side thereof with a video signal detection output and an AFT voltage output, by the use of a unit search frequency band which is prescribed by the characteristic of a lower-side adjacent voice trap on the lower frequency side and the PLL lock-in range of a video signal demodulator on the higher frequency side. In addition, the checked results are stored as the positions of the unit search frequency bands of the band to-be-searched.

1 Claim, 6 Drawing Sheets

TELEVISION SIGNAL SELECTION DEVICE

BACKGROUND OF THE INVENTION

This invention relates to a television signal selection device in a television receiver for automatically searching for a proper video signal or for promptly leading a received signal into a proper state.

FIG. 1 is a block arrangement diagram of a television signal receiving set. This receiving set comprises an antenna 1, an RF amplifier 2, a local oscillator and mixer 3, a PLL circuit and prescaler 4, a microcomputer for channel selection 5, an intermediate circuit (a SAW filter 6, an adjacent voice trap 7, and a video signal demodulator 8), a video signal processor 9, a CRT 10, and a video signal detector 13. Numeral 11 designates an AFT voltage output which is applied from the video signal demodulator 8 to the channel selecting microcomputer 5, and numeral 12 a video signal detection output which is provided from the video signal detector 13. The SAW filter 6 and the adjacent voice trap 7 constitute a SAW filter with an adjacent voice trap characteristic.

FIG. 2 shows the characteristics of an AFT voltage (a voltage for automatic reception frequency tuning) and a television signal detection output versus a transmission carrier frequency deviation in a television receiver which has a system (hereinbelow, termed "pseudo-synchronous demodulation system") hitherto often used wherein a video carrier is sampled by a resonance coil to perform the quadrature demodulation of a video intermediate-frequency signal. In the above system, the resonance characteristic of the video carrier is comparatively gentle. Therefore, even for transmission frequency deviations in, for example, the HRC or ICC format of CATV broadcast in U. S. A., the optimum reception state could be established in such a way that the PLL circuit and prescaler 4 shown in FIG. 1 was controlled using a decision at the reception of a regular reception frequency as stated below. Assuming in FIG. 2 that a frequency range for search is a regular transmission frequency ±2 MHz, a received television signal is presumed to lie in a range from a deviation $-f_1$ to $+2$ MHz if the television signal detection output at the reception of the point of a transmission frequency deviation of zero is "high," and it is presumed to lie in a range from the deviation $-f_1$ to $-2$ MHz or to be quite nonexistent if the detection output is "low." Once the television signal has been detected, it can be thereafter led to the optimum reception frequency according to the characteristic curve (or S-shaped characteristic curve) of the AFT voltage versus the transmission carrier frequency deviation. This operation is illustrated in a flow chart of FIG. 4. If the television signal is detected upon the selection of the regular reception frequency $f_o$ by the PLL circuit, the received frequency is raised from the previous frequency every $\Delta f$ along the path of a loop $l_1$. In contrast, if the television signal is not detected, the received frequency is lowered every $\Delta f$ along the path of a loop $l_2$. Thus, it is possible to arrive at the optimum reception state in which the television signal exists and in which the AFT is in an M mode.

FIG. 3 shows the frequency correlation of video, chroma and sound carriers in a transmitted television signal, and the overall response characteristic of the video intermediate-frequency circuit of a television receiver receiving the transmitted signal, including a lower-side adjacent voice signal trap.

The television receiving set in the prior art is constructed as described above, and can search for the television signal comparatively easily. However, it has had the problem that a long time is required to determine an absence of a proper video signal in a frequency band for search or to determine when a received signal is extremely spaced from the regular reception frequency. Meanwhile, requests for a higher picture quality and a higher tonal quality have recently been made suddenly, and a system (hereinbelow, termed "complete synchronous demodulation system") is adopted wherein the video carrier for the quadrature demodulation is generated using a PLL in the video signal demodulator 8 shown in FIG. 1. Since, however, the lock-in range of the PLL exists in this case, the prior-art system illustrated in FIGS. 2–4 has been incapable of appropriately receiving the television signal in a case where the television signal lies in a frequency region departing from the lock-in range and where the frequency region is a frequency region to be searched.

SUMMARY OF THE INVENTION

This invention has been made in order to solve the problems as described above, and has for its object to provide a television signal selection device which can reliably and promptly search for a television signal even in a television receiver that can produce an AFT output signal and a television signal detection output only in a narrow frequency band.

The television signal selection device according to this invention operates such that a band to-be-searched within a channel is checked successively from the upper side toward the lower side with a video signal detection output and an AFT voltage output. The check is done using a unit search frequency band, which is prescribed by the characteristic of a lower-side adjacent voice trap, on the lower frequency side and the PLL lock-in range of a video signal demodulator on the higher frequency side as illustrated in FIG. 5. In addition, the checked results are stored as the positions of the unit search frequency bands of the band to-be-searched.

The upper limit of the unit search frequency band in this invention may be below a frequency determined by the PLL lock-in range of the video signal demodulator and is scanty of definiteness, whereas the lower-limit frequency determined by the voice trap characteristic of the lower-side adjacent channel is definitely fixed to a point which is 1.25 MHz lower than a regular video carrier. Accordingly, when the band to be searched is divided into the unit search frequency bands which are then searched from the upper side, the presence or absence of a television signal can be reliably analyzed gradually from the upper side without being affected by a video signal which will appear in due course.

Moreover, since the information items, of the video signal obtained by the search, are stored as the positions of the detected unit search frequency bands of the video signal for the frequency band to-be-searched, they can be applied to the discrimination of a spurious video signal ascribable to the voice of the adjacent lower-side channel appearing in the adjacent upper-side channel or to the utilization of the signal-present unit search frequency band information at the time at which the particular channel is selected again.

DESCRIPTION OF THE PREFERRED EMBODIMENT

Figure 1:
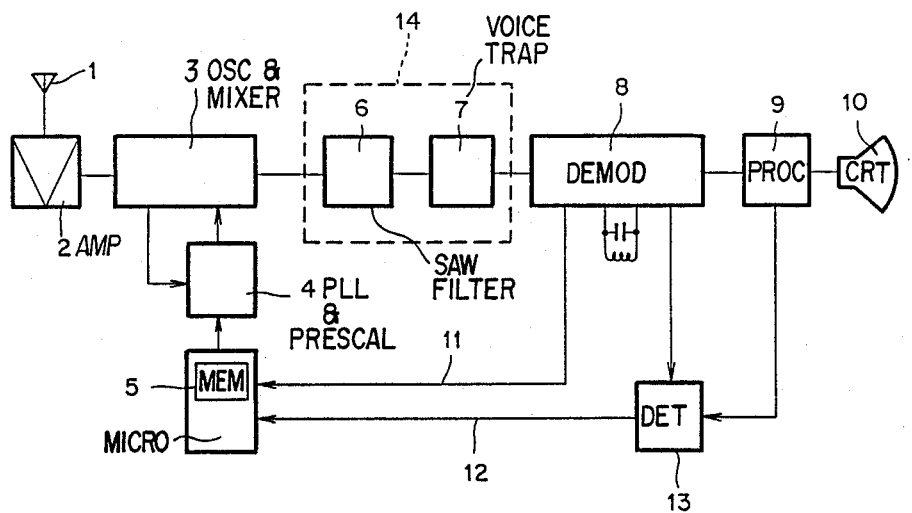
FIG. 1 is a block arrangement diagram of a television signal receiver in which a section from a signal input stage to a video signal demodulation output is shown in detail.
Figure 2:
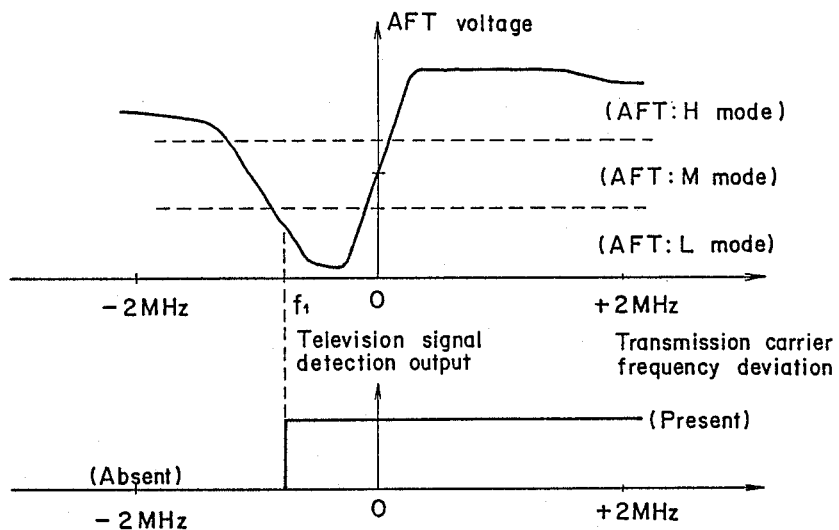
FIG. 2 is a diagram in which the AFT voltage of a video intermediate-frequency circuit employing a pseudosynchronous demodulator and the television detection output are shown versus the transmission carrier deviation, and as an expedient for selecting the point of the transmission carrier deviation of zero, AFT output voltages are divided into three regions to set H, M and L modes in the order of higher AFT.
Figure 3:
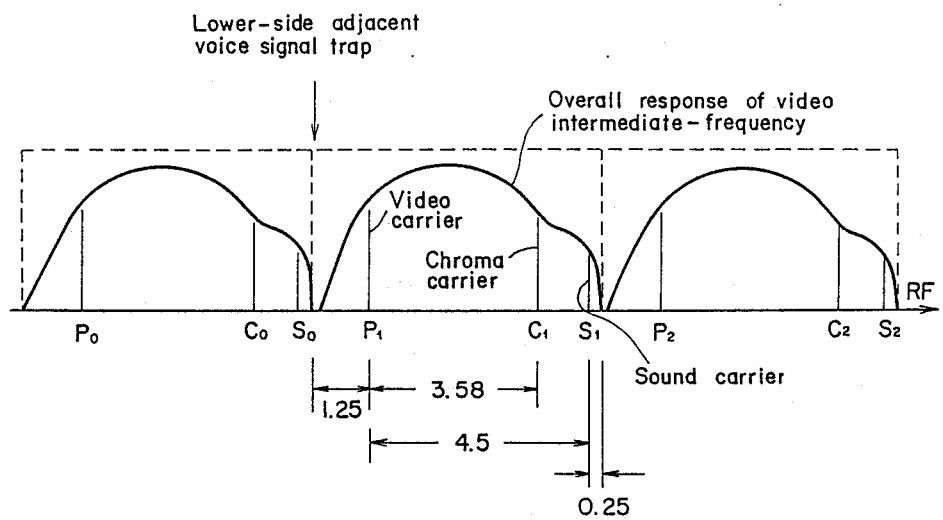
FIG. 3 shows the frequency correlation of video, chroma and sound carriers in a transmitted television signal, and the overall response characteristic of the video intermediate-frequency circuit of the television receiver receiving the signal, including a lower-side adjacent voice signal trap.
Figure 5:
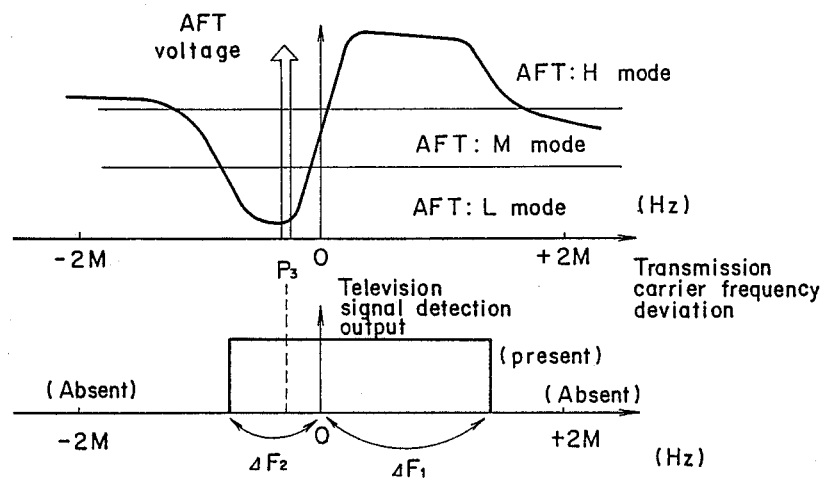
FIG. 5 is a diagram in which the AFT voltage of a video intermediate-frequency circuit employing a complete synchronous demodulator and the detection output of a television signal are shown versus the transmission carrier deviation, and the regions of the H, M and L modes of AFT are set.
Figure 4:
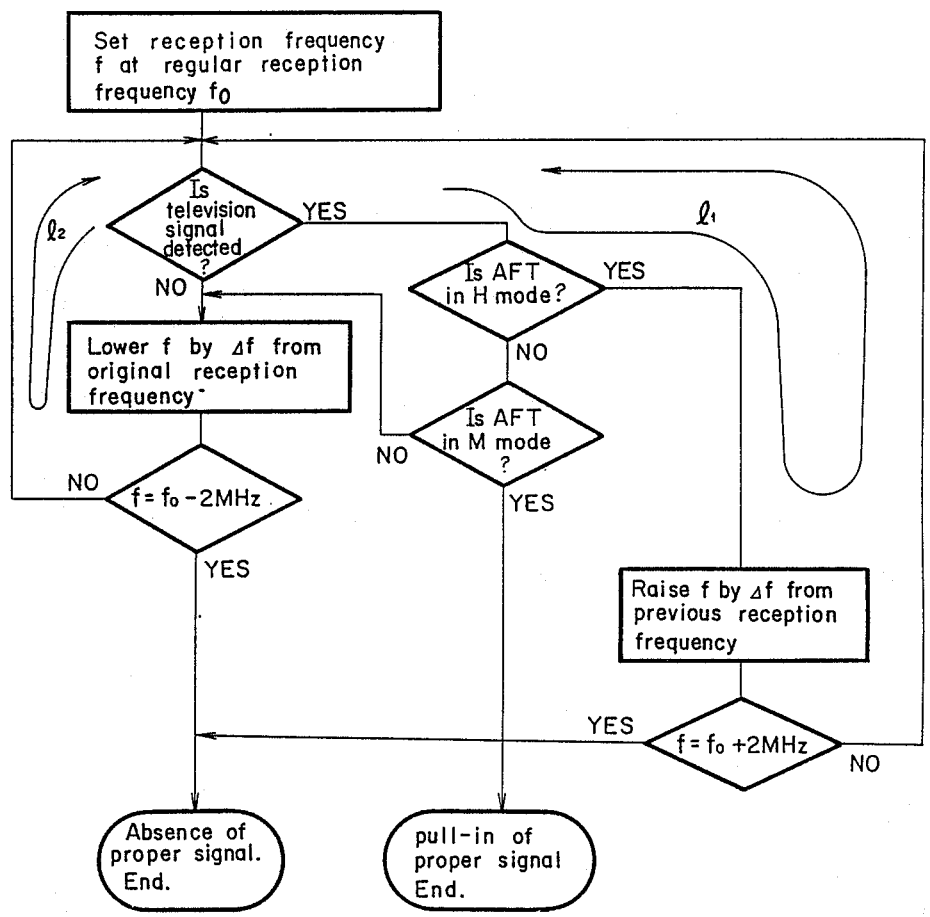
FIG. 4 is a flow chart for the pull-in of a proper signal based on a television signal search system in a prior art.
Figure 6:
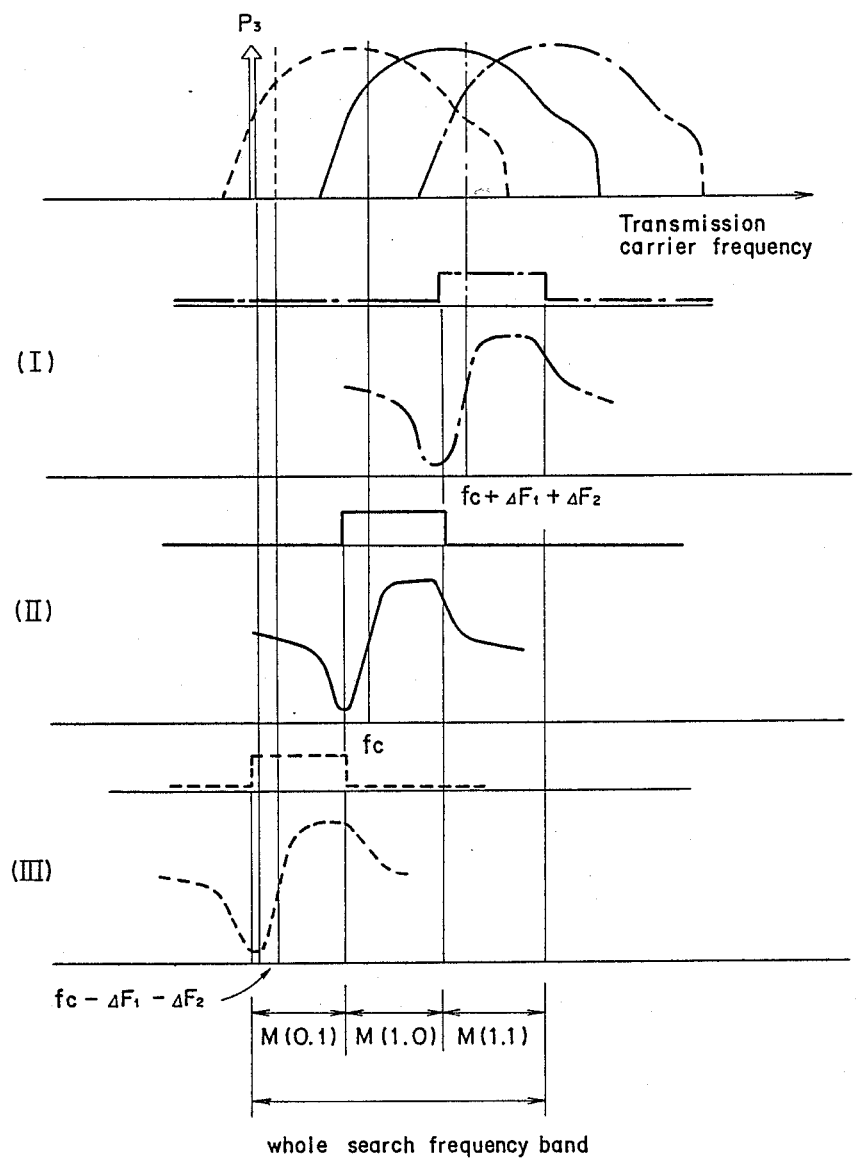
FIG. 6 shows the shift of the intermediate-frequency overall response, as well as the attendant changes of the AFT voltage and the television signal detection output, at the time at which a reception frequency is changed by a PLL circuit and prescaler 4, a channel selecting microcomputer 5, and a local oscillator and mixer 3 in order to catch a video signal $P_3$ where the whole search band in each channel is composed of three unit search frequency bands.
Figure 7:
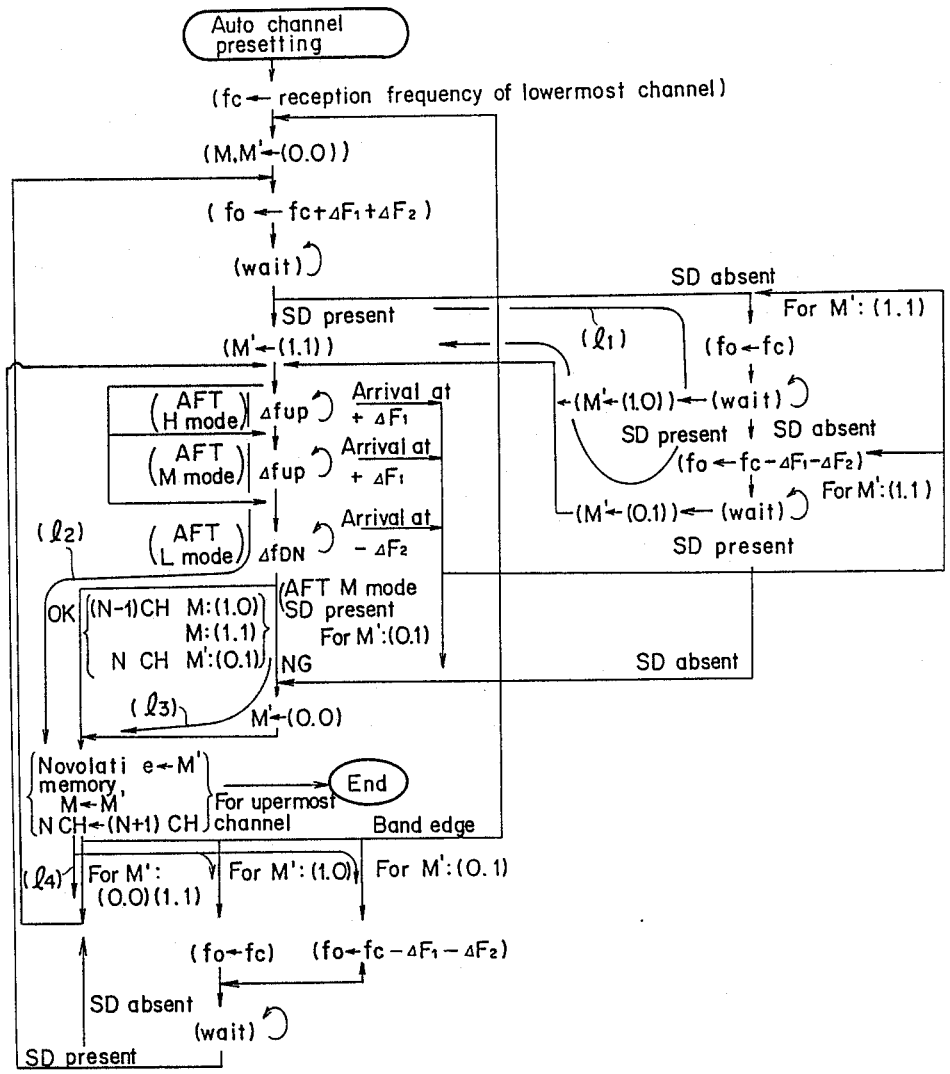
FIGS. 7 and 8 are flow charts in the automatic channel presetting mode and channel selecting mode of the device of this invention, respectively.
Figure 8:
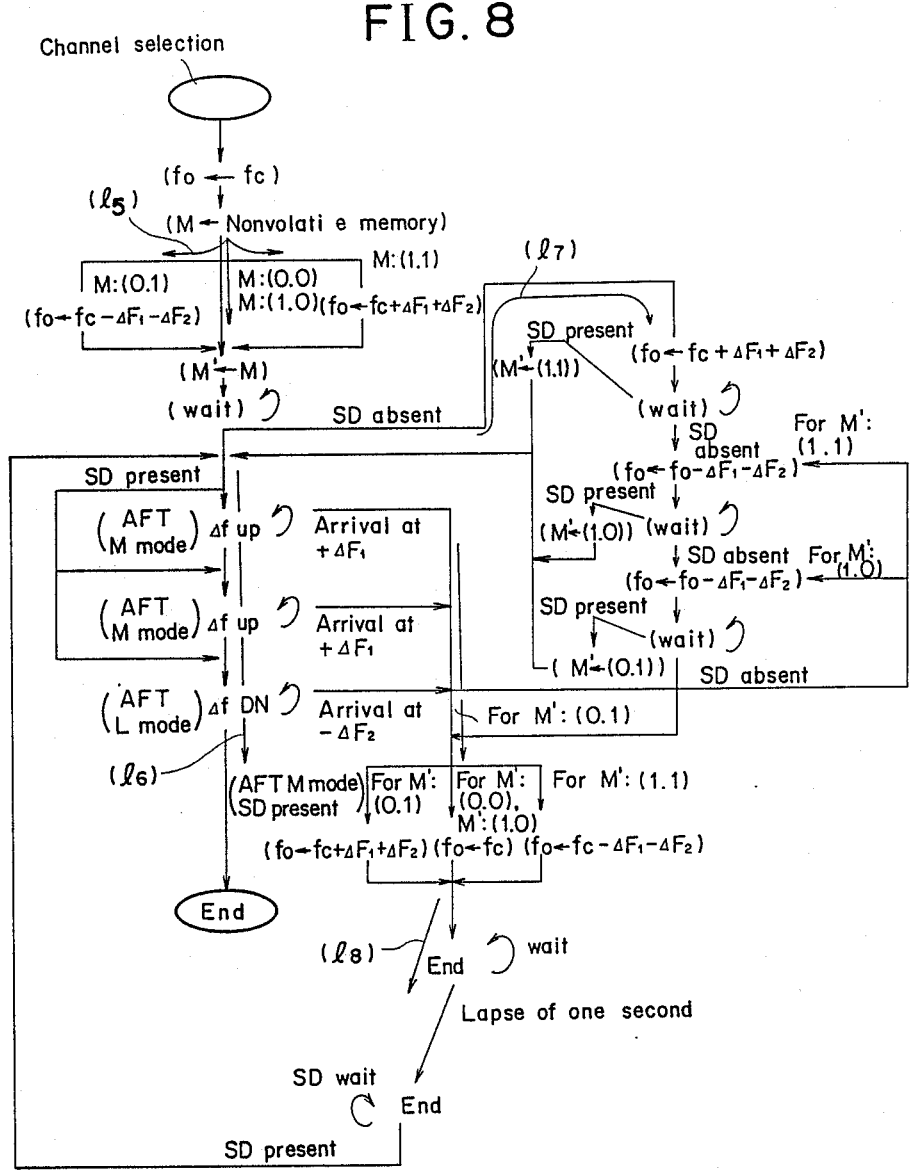

Now, an embodiment of this invention will be described with reference to the drawings. The block arrangement of the device is as illustrated in FIG. 1. FIGS. 7 and 8 are state transition diagrams, and FIGS. 5 and 6 show an AFT voltage and a television signal detection output in a unit search frequency band. First, FIG. 7 is the state transition diagram when an automatic channel presetting mode is executed. In the figure, SD indicates the television signal detection output, and M(1, 1), M(1, 0) and M(0, 1) indicate the respective positions of parts obtained when the whole search frequency band is divided into three parts from an upper side thereof by the use of the unit search frequency band shown in FIG. 5. Besides, M(0, 0) is employed for indicating a case where a proper video signal has not been found in any unit search frequency band by the search. In addition, M' denotes a working memory which temporarily stores each search mode state, $f_c$ denotes the regular video carrier frequency of a selected channel, and $f_0$ denotes a working video reception frequency for executing each search mode.

An expedient for searching for a video signal existent at $P_3$ in FIG. 6 will be described along the flow of FIG. 7. First, the reception frequency is set at $(f_c + \Delta F_1 + \Delta F_2)$ which is higher than the original frequency of the regular reception channel by the unit search frequency band, whereupon the detection output SD is checked. This state corresponds to (I) in FIG. 6. Since the signal $P_3$ does not exist in this band, it is decided that the detection output SD is absent, and the processing in FIG. 7 proceeds in a direction $l_1$. That is, the reception frequency is set at the frequency $f_c$ which is assigned to the regular reception channel. This state corresponds to (II) in FIG. 6. Since the signal $P_3$ does not exist in this band, either, "SD absent" is decided, and a reception frequency $(f_c - \Delta F_1 - \Delta F_2)$ is set in order to receive the final unit search frequency band. Since the signal $P_3$ exists in this band as shown at (III) in FIG. 6, "SD present" is decided, and information (0, 1) is stored in the memory M'. Thereafter, the reception frequency is finely tuned every $\Delta f$ in accordance with processing $l_1$ until the AFT voltage becomes the M mode. As a result, the information of the memory M' is stored in a nonvolatile memory. Here, processing $l_3$ is a process in which a spurious signal ascribable to an adjacent lower-side voice signal is discriminated on the basis of the information M of the last-selected channel and the information M' being the result of the channel search at this time. Besides, as indicated at $l_4$, the information M' obtained by the search at this time is applied at the first stage of the search of the next channel and is utilized for the prompt video signal search.

Next, FIG. 8 shows an example of the state transition diagram in the case where the information items M of the unit search frequency bands once stored in the nonvolatile memory are utilized at the selection of a channel. First, the information in the preceding search is called out of the nonvolatile memory by processing $l_5$, and the reception frequency is separately set at $(f_c - \Delta F_1 - \Delta F_2)$, $f_c$ or $(f_c + \Delta F_1 + \Delta F_2)$ in accordance with the content of the information. Thereafter, the television signal detection output SD is checked. In the presence of the detection output SD, processing $l_6$ corrects the maximum reception frequency deviations $+\Delta F_1$ and $-\Delta F_2$ within the unit search frequency bands by utilizing the AFT voltages and establishes the proper reception state. On the other hand, in the absence of the detection output SD, the flow enters processing $l_7$, which is similar to the processing $l_1$ in FIG. 7. Further, in a case where the proper video signal has not been detected as the result of the processing $l_5 - l_7$, the appearance of the detection output SD is waited in each of the unit search frequency bands called out of the nonvolatile memory at the channel selecting manipulation, and processing $l_8$ for entering the processing $l_6$ or $l_7$ again is executed simultaneously with the appearance.

As described above, according to this invention, a frequency band to be searched within a channel is divided using a unit search frequency band whose lower limit and upper limit are set, and the divided bands are checked from the upper side toward the lower side by a video signal detection means and AFT voltage generation means, thereby to detect a proper video signal, so that the presence or absence of a television signal can be detected reliably and promptly. Moreover, since the information of the video signal obtained by the search is stored as the position of the unit search frequency band where the video signal for the frequency band to be searched has been detected, it can be applied to the discrimination of a spurious video signal attributed to the voice of an adjacent lower-side channel appearing in an adjacent upper-side channel or to the utilization of the signal-present unit search frequency band information at the time at which the particular channel is selected again.

What is claimed is:

1. In a television signal receiving set which receives television signals of a first system of frequency assignment in which respective channels are assigned the video carrier frequencies thereof with a predetermined frequency space and a plurality of systems of frequency assignment in which the respective channels are assigned the video carrier frequencies thereof with a predetermined frequency offset on the lower sides and on the upper sides of the respective channels of said first system, said television signal receiving set including, means connected with an intermediate frequency circuit and serves to operate as a frequency discriminator for outputting a voltage for automatic adjustment of a receiving-frequency;

video signal detecting means connected with said intermediate frequency circuit for detecting a video signal in the television signal received to output a video signal detection signal;

a high frequency tuning circuit having a local oscillator which is formed of a phase locked loop circuit for finely adjusting an oscillation frequency thereof on the basis of said voltage and said detection signal, said high frequency tuning circuit finely adjusting the video intermediate frequency of said television signal received;

memory means connected with said intermediate frequency circuit for storing presence and absence of the video carrier of a selected channel:

wherein a television signal selection method comprises a series of steps for carrying out automatic channel present operation and a series of steps for performing normal channel selection after completion of the automatic channel preset operation; said series of steps for carrying out automatic channel preset comprising:

(1) calculating a unit search frequency band which is used to determine where in the occupied band width of each channel the video signal exists, said unit search frequency band being defined by a lower limit frequency equal to an audio-trap frequency of an adjacent lower channel and an upper limit frequency such that frequency discriminator characteristic of said means for outputting the voltage for automatic adjustment of a receiving-frequency is included between said lower limit frequency and said upper limit frequency;

(2) dividing said occupied band width of each channel into a plurality of unit search frequency bands by said unit search frequency band and searching said occupied band width from the highest unit search frequency band to the lowest unit search frequency band for a correct video signal on the basis of said video detection signal;

(3) consecutively searching the respective channels for a video signal using step (2) in ascending order from the lowest channel to the highest channel of said first system;

(4) storing a position data indicative of a position of the unit search frequency band within said occupied frequency band width at which said correct video signal is detected;

(5) searching the adjacent upper channel for the video signal on the basis of said position data of the adjacent lower channel, and returning to step (2) if the correct video signal is not received;

(6) determining that a signal received in the adjacent upper channel is a false video signal if a correct video signal has been found in the adjacent lower channel with a position data representative of any one of a frequency equal to and a frequency higher than that assigned in said first system and while a signal also having been found with a position data representative of a frequency lower than that beyond an established limitation of tolerance on the negative side of said upper channel in said first system;

(7) reading out, upon a command for channel selection, the position data corresponding to the channel selected, and searching the channel for a video signal on the basis of the position data, and for carrying out step (2) if the correct video signal is not found; and (8) waiting for the arrival of the television signal based upon the position data used in step (7) if the correct video signal is not found in step (7), and carrying out step (7) when the television signal arrives.

* * * * *